United States Patent
Mehnert

(10) Patent No.: US 12,488,251 B2
(45) Date of Patent: Dec. 2, 2025

(54) METHOD FOR CONFIGURING A NEURAL NETWORK

(71) Applicant: Robert Bosch GmbH, Stuttgart (DE)

(72) Inventor: Jens Eric Markus Mehnert, Malmsheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1133 days.

(21) Appl. No.: 17/119,223

(22) Filed: Dec. 11, 2020

(65) Prior Publication Data

US 2021/0192285 A1    Jun. 24, 2021

(30) Foreign Application Priority Data

Dec. 19, 2019   (DE) .......................... 102019220145.8

(51) Int. Cl.
| | |
|---|---|
| *G06N 3/084* | (2023.01) |
| *G06F 18/21* | (2023.01) |
| *G06F 18/214* | (2023.01) |
| *G06F 18/243* | (2023.01) |
| *G06N 3/08* | (2023.01) |
| *G06N 5/04* | (2023.01) |
| *G06V 10/94* | (2022.01) |

(52) U.S. Cl.
CPC ......... *G06N 3/084* (2013.01); *G06F 18/2148* (2023.01); *G06F 18/217* (2023.01); *G06F 18/243* (2023.01); *G06N 3/08* (2013.01); *G06N 5/04* (2013.01); *G06V 10/95* (2022.01)

(58) Field of Classification Search
CPC . G06N 3/084; G06N 3/08; G06N 5/04; G06F 18/2148; G06F 18/217; G06F 18/243
See application file for complete search history.

(56) References Cited

U.S. PATENT DOCUMENTS

| | | | |
|---|---|---|---|
| 6,185,554 B1 * | 2/2001 | Bennett | G06F 16/90344 |
| 10,997,492 B2 * | 5/2021 | Migacz | G06N 3/04 |
| 2019/0005377 A1 * | 1/2019 | Malaya | G06N 3/042 |
| 2021/0125042 A1 * | 4/2021 | Han | G06N 3/063 |

OTHER PUBLICATIONS

Sarkar ("Multilayer neural network synchronized secured session key based encryption in wireless communication", IAES International Journal of Artificial Intelligence, vol. 8, No. 1, Mar. 2019, pp. 44-53) (Year: 2019).*

* cited by examiner

*Primary Examiner* — Tan H Tran
(74) *Attorney, Agent, or Firm* — NORTON ROSE FULBRIGHT US LLP

(57) ABSTRACT

A method for configuring a neural network. The method includes: feeding image data to the neural network implemented on a training hardware; feeding the image data to a neural network implemented on an inference hardware; ascertaining a deviation between output data of the training hardware and output data of the inference hardware; and ascertaining noise parameters for the neural network in such a way that after feeding the image data to the neural network implemented on the training hardware and after feeding image data to the neural network implemented on the inference hardware, the output data of the inference hardware and the output data of the training hardware are bit-identical.

11 Claims, 3 Drawing Sheets

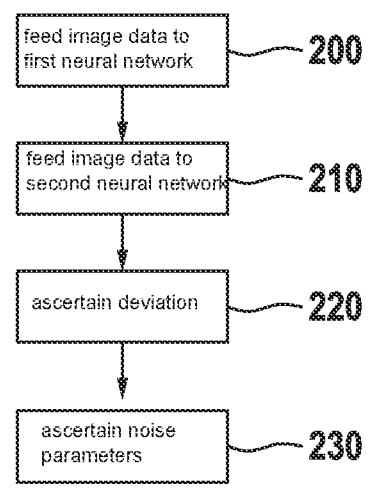

METHOD FOR CONFIGURING A NEURAL NETWORK

CROSS REFERENCE

The present application claims the benefit under 35 U.S.C. § 119 of German Patent Application No. DE 102019220145.8 filed on Dec. 19, 2019, which is expressly incorporated herein by reference in its entirety.

FIELD

The present invention relates to a method for configuring a neural network. The present invention further relates to a method for training a neural network, which includes noise parameters that have been ascertained according to the provided method. The present invention further relates to a computer program. The present invention further relates to a machine-readable memory medium.

BACKGROUND INFORMATION

Present DNN (deep neural network)-inference hardware represents among other things, a compromise between chip surface and efficiency. Since floating point computing devices are more expensive than digital signal processors (DPSs), DSPs are utilized for DNN calculation in most cases. One common approach in this case is to train DNNs offline, a fixed point value-DNN being provided for the inference hardware. Since compromises have often been made with respect to the hardware in order to save chip surface and operating costs, it often occurs that computing operations incomprehensible to the user of the inference hardware are carried out. This may result, for example, in over-saturation or under-saturation effects for the inference hardware during a conventional training of the DNNs.

This may, for example, be due to the fact that the functionality of the inference hardware may only be accessed via a framework, but also due to the inference hardware itself if the hardware includes stochastic elements. There are in this case parallels to Deep Bayesian Neural Networks, which attempt to model the uncertainty of the data utilized.

SUMMARY

One object of the present invention is to provide an improved method for configuring a neural network.

The object may be achieved according to one first aspect of the present invention with a method for configuring a neural network. In accordance with an example embodiment of the present invention, the method includes the steps:
  feeding image data to the neural network implemented on a training hardware;
  feeding image data to a neural network implemented on an inference hardware;
  ascertaining a deviation between output data of the training hardware and output data of the inference hardware; and
  ascertaining noise parameters for the neural network in such a way that after feeding the image data to the neural network implemented on the training hardware and after feeding the image data to the neural network implemented on the inference hardware, the output data of the inference hardware and the output data of the training hardware are bit-identical.

In this way, noise parameters are ascertained in such a way that results on the training hardware are bit-identical to the results on the inference hardware. As a result, the neural network may thus be trained on the training hardware immediately after ascertainment of the noise parameters for the purpose of implementation on the inference hardware.

Errors between the floating point-capable training hardware and the fixed point-capable inference hardware are taken into account in the process. In this way, an output behavior of the neural network on the training hardware preferably closely approximates an output behavior of the neural network on the inference hardware. As a result, it is not necessary to consider rounding errors of the inference hardware, which are generally not reproducible, allowing a development effort to be focused on the improvement of the neural network. As a result, it is possible in this way to save significant time for the detailed study of operational properties of the inference hardware. Per se unknown errors are modeled according to the present invention by a noise distribution.

According to one second aspect of the present invention, the object may be achieved with a method for training a neural network implemented on a training hardware, which includes noise parameters that have been ascertained according to a method provided for configuring this neural network.

According to one third aspect of the present invention, the object may be achieved with a computer program including commands which, when the computer program is executed by a computer, prompt the computer to carry out a method for configuring a neural network.

According to one fourth aspect of the present invention, the object may be achieved with a machine-readable memory medium, on which the computer program is stored.

Preferred example embodiments of the method in accordance with the present invention are described herein.

One advantageous refinement of the method in accordance with the present invention includes that at least one object class is used as output data of the neural networks. In this way, it is possible to compare simplified output data of the neural networks with one another, only object classes being incorporated into the ascertainment of deviations. As a result, a simple manner of comparing output data of the neural networks is supported.

One further advantageous refinement of the method in accordance with the present invention includes that intermediate results from layers of the neural network are used as output data of the neural networks. In this way, more complex output data of the neural networks are compared with one another, an even more accurate establishment of a deviation of the output data of the neural networks being enabled in this way. As a result, it is thus possible to even better achieve the behavior of the neural networks with respect to bit identity.

One further advantageous refinement of the method in accordance with the present invention includes that a deviation between the output data is propagated back to noise distributions from layers of the neural network implemented on the training hardware. In this way, a behavior of the inference hardware, which per se represents a blackbox, is modeled with a noise behavior of the neural network. For this purpose, a method of back propagation known per se is used.

One further advantageous refinement of the method in accordance with the present invention includes that the neural networks are configured with identical or with different parameters. The fact that the deviations between the output data of the neural networks on the training hardware and on the inference hardware are even better ascertainable is thereby advantageously supported.

One further advantageous refinement of the method in accordance with the present invention includes that the image data fed to the training hardware and to the inference hardware are changed. In this way as well, it is possible to even better ascertain deviations between the output data of the neural networks on the training hardware and on the inference hardware.

BRIEF DESCRIPTION OF THE DRAWINGS

The present invention is described below including further features and advantages with reference to multiple figures. Identical or functionally identical elements have the same reference numerals.

FIG. 4 shows a basic representation of one specific embodiment of the method in accordance with the present invention.

DETAILED DESCRIPTION OF EXAMPLE EMBODIMENTS

A main feature of the present invention is to configure or prepare a neural network in such a way that it may be trained in a robust manner for the inference hardware. In this way, it is advantageously possible to compensate for hardware/software errors of the inference hardware, whose technical details are often unknown or not exactly known. In this way, extensive studies of more exact hardware properties of the inference hardware may be advantageously saved.

Without the method in accordance with the present invention, the behavior of the inference hardware would have to be replicated with great technical effort also on the training hardware.

The present invention enables the training of neural networks on training hardware for specific embedded inference hardware, which, not fully described or despite description, significantly delays the technical development activity on the inference hardware due to high complexity, which may, for example, be caused by limited resources of hardware users.

One significant advantage of the example method is that before a training start of a neural network for the inference hardware, it is ensured that the neural network in question on the inference hardware behaves the same as on the training hardware. Thus, a certain reliability may be ensured and only then are usable results of the neural network executed on the inference hardware even obtained.

Without loss of generality, the inference hardware (for example, in the form of a surroundings identification sensor of a vehicle, for example, a camera, a LIDAR sensor, an ultrasonic sensor, a radar sensor, etc.), is designed as an only partially described or known hardware, in which outputs (feature maps) may be read out from individual layers. In this case, a rapid inference with the aid of the inference hardware may not be assumed.

In addition, 16 bits for weights and outputs, for example, may be available for the inference hardware. The fixed point format, i.e., how many bits are available for integer and point fraction is not relevant, since the inference hardware influences whole bits and errors accumulate as a result.

Figure 1:
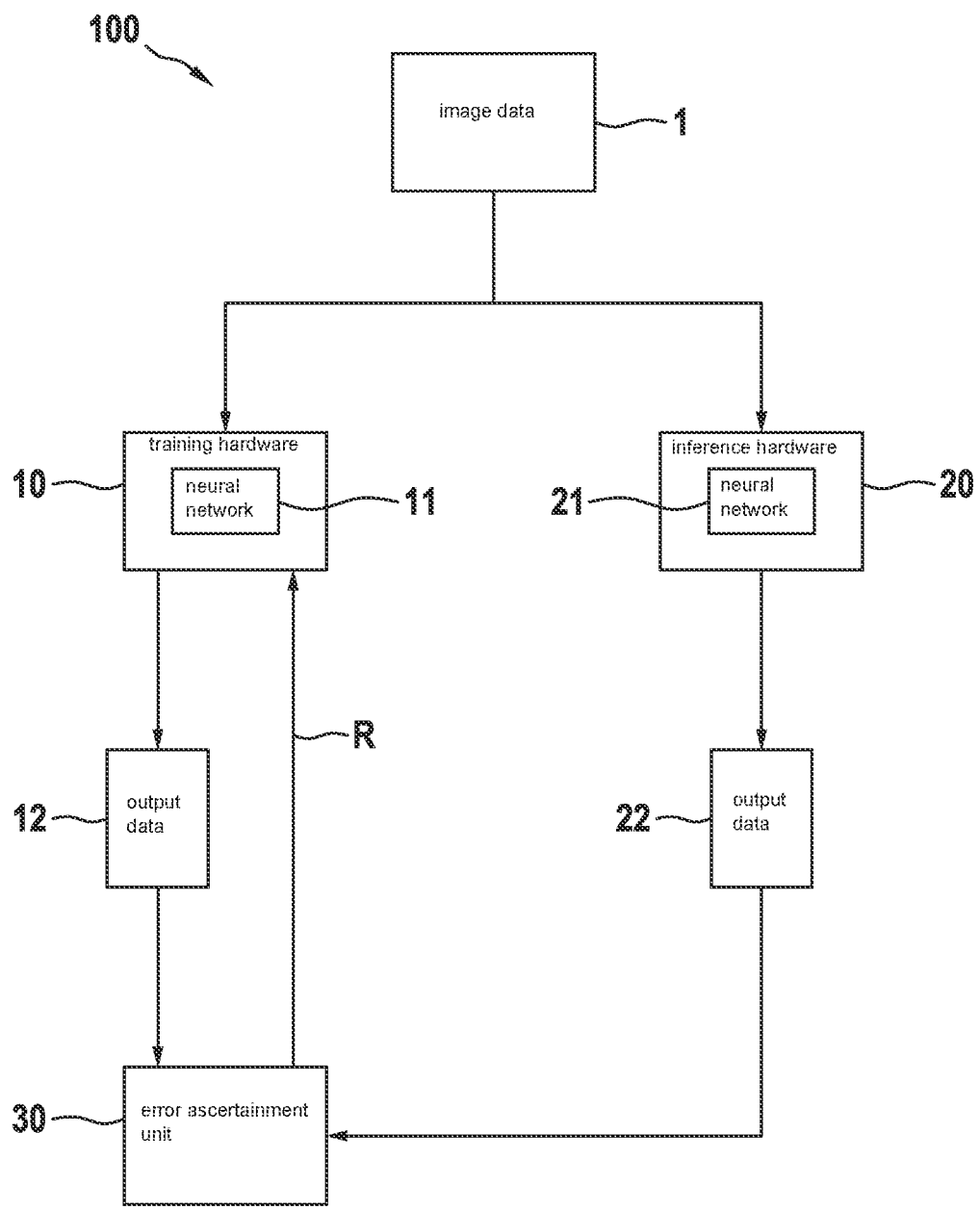
FIG. 1 shows a basic representation of a mode of operation of an example embodiment of the method in accordance with the present invention.

FIG. 1 shows a basic system diagram including an elucidation of a mode of operation of the method provided. A training scenario with a system 100 including a training hardware 10 and an inference hardware 20 (inferring perception hardware, for example, a camera) is apparent. Inference hardware 20 is used for identifying objects from image data 1 and may, for example, be designed as a camera, a LIDAR sensor, a radar sensor, an ultrasonic sensor, etc., which may be installed preferably in a vehicle (not depicted).

Inference hardware 20 is generally a system-on-chip (SoC) that includes a limited, i.e., optimized, surface, computing capacity and electrical power consumption. In this case, a different number system, for example, is used on inference hardware 20 than on training hardware 10, namely, the integer number format instead of the floating point number format. As a result, however, it is not possible to represent complete neural network 11 on inference hardware 20 at once.

It is apparent that identical image data 1 (for example, in the form of detected images and/or random images) are fed both to training hardware 10 including one first neural network 11 as well as to inference hardware 20 including a second neural network 21. Furthermore, neural networks 11, 21 are configured in an initial step with identical, invariable weights or parameters. Output data 21 of second neural network 20 are fed to an error ascertainment unit 30, to which output data 11 of training hardware 10 including first neural network 11 are also fed.

Error ascertainment unit 30 ascertains a deviation or an error between output data 21 of inference hardware 20 and output data 11 of training hardware 10, the ascertained error being propagated back in an iterative process into individual noise parameters R of neural network 11 of training hardware 10. This is carried out until the error is essentially zero. As a result, this means that training hardware 10 including first neural network 11 and inference hardware 20 including second neural network 21 now deliver bit-identical output data or results using the same image data 1 and identically parameterized neural networks 11, 21.

The back propagation of the error may, for example, be carried out with the aid of a conventional gradient descent method.

Ascertained noise parameters R or parameters of the noise distribution may advantageously also be utilized for future trainings.

After completion of this method, first neural network 11 on the training hardware is configured with suitable noise parameters R, which henceforth remain unchanged. Neural network 11 configured in such a way may now be trained in a conventional manner, trained neural network 11 being capable of being transferred onto inference hardware 20 at the end of the training. This ensures that an inference behavior of inference hardware 20 including neural network 11 configured according to the present invention and trained below now delivers bit-identical results similar to trained neural network 11 on training hardware 10.

This may be of great advantage for safety-critical designs of inference hardware 20, for example, for surroundings detection sensors in the vehicle, in which for legal reasons an error behavior must be bit-identically reproducible.

In one simple variant of the provided method, it may be provided that merely classifications as output data are checked and compared with one another, it being checked, for example, whether objects from image data 1 are immediately recognized by inference hardware 20 and training hardware 10 (for example, as human, infrastructure object, auto, etc.)

In one variant of the example method, it may be provided that intermediate results from layers of second neural network 21 may be used as output data 22 of inference hardware 20 including second neural network 21, which are compared with output data 12 of training hardware 10 including neural network 11 in the form of intermediate results from layers of neural network 11.

As a result, noise distributions from outputs of individual layers of neural networks 11, 21 are estimated using the provided method. For this purpose, preferably numerous evaluations of trained neural networks 11, 21, including the outputs of all layers are preferably used. It may advantageously also be that multiple networks 11, 21 trained independently of one another are utilized for evaluation.

The differences between neural network 11 calculated on training hardware 10 and the neural network converted onto inference hardware 20 may then be calculated and the error distribution estimated therefrom. If only the highest significant image is of interest, a one-sided test may also be carried out, which is advantageous due to the limited data status, a uniform distribution being selected as the error distribution, for example.

An advantage of the provided method is that an exact understanding of inference hardware 20 is not required, as a result of which development time may be advantageously saved. A more exact estimation of the error distribution is also provided for the individual layers of neural networks 11, 21, which results in greater bit accuracy and thus in better neural networks on inference hardware 20.

Figure 2:
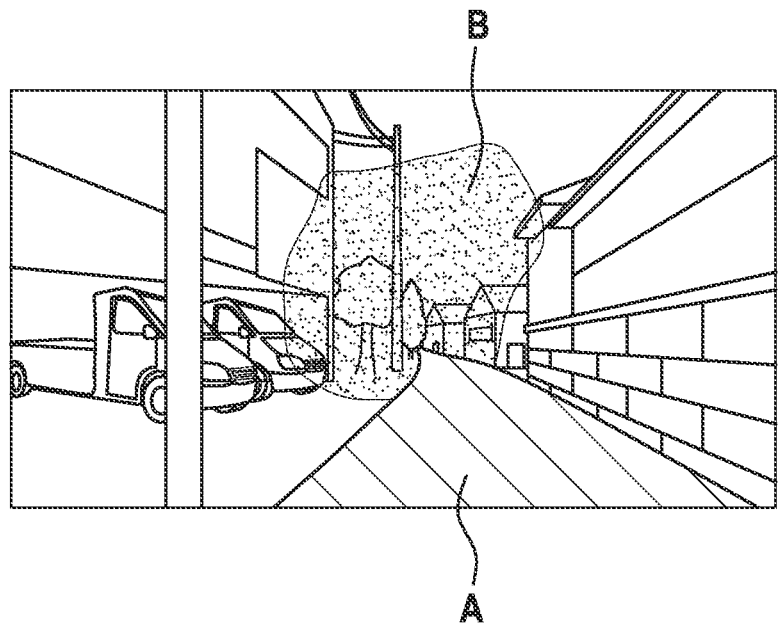
FIG. 2 shows a result of an inference hardware without applying the present invention.
Figure 3:
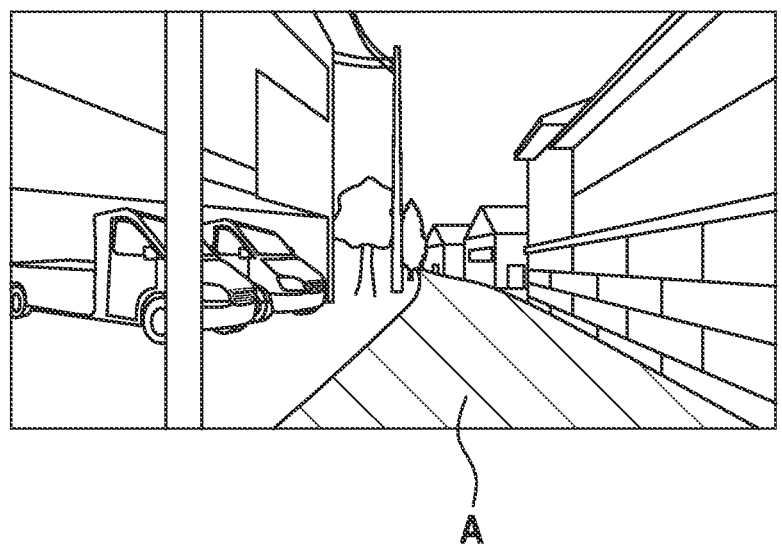
FIG. 3 shows a result of an inference hardware while applying the present invention.

FIGS. 2 and 3 show an effect of the provided method. An image provided by inference hardware 20 without the use of the provided method is apparent in FIG. 2. Areas A, B are apparent within the image area, which are differently resolved. An area A corresponds to a road course and is well resolved. An area B, however, is not exactly resolved, which may be problematic due to the fact that area B has a significant share of the entire image.

FIG. 3 shows an image provided by inference hardware 20 using the provided method. In this case, area B is not even present and only area A is resolved. As a result, this means an improved operating behavior of inference hardware 20.

FIG. 4 shows a basic flowchart of one specific embodiment of the provided method.

In a step 200, image data 1 are fed to neural network 11 implemented on a training hardware 10.

In a step 210, a feeding of image data 1 to a neural network 21 implemented on an inference hardware 20 is carried out.

In a step 220, a deviation between output data 12 of training hardware 10 and output data 22 of inference hardware 20 is ascertained.

In a step 230, an ascertainment of noise parameters R for neural network 11 is carried out in such a way that after feeding image data 1 to neural network 11 implemented on training hardware 10 and after feeding image data 1 to neural network 21 implemented on inference hardware 20, output data 22 of inference hardware 20 and output data 12 of training hardware 10 are bit-identical.

The provided method is preferably designed as a computer program, which includes program code means for carrying out the method on training hardware 10 and on inference hardware 20.

Although the present invention is described above based on specific exemplary embodiments, those skilled in the art may also implement specific embodiments not described or only partially described above, without departing from the core of the present invention.

What is claimed is:

1. A method for configuring a neural network for operation on inference hardware to detect surroundings, including the following steps:
   configuring a first neural network on a training hardware and a second neural network on an interference hardware with identical initial parameters;
   feeding image data to the first neural network implemented on the training hardware and executing the first neural network by the training hardware to generate output data of the training hardware based on the image data, the first neural network including noise parameters;
   feeding the image data to the second neural network implemented on the inference hardware and executing the second neural network by the inference hardware to generate output data of the inference hardware based on the image data, wherein the training hardware uses a different number system than the inference hardware;
   iteratively (i) ascertaining a deviation between output data of the training hardware and output data of the inference hardware and (ii) ascertaining the noise parameters for the first neural network based on the deviation, until feeding the image data to the first neural network implemented on the training hardware and using the ascertained noise parameters and feeding the image data to the second neural network implemented on the inference hardware produces the output data of the inference hardware and the output data of the training hardware that are bit-identical;
   training the first neural network having the ascertained noise parameters on the training hardware; and
   executing the trained first neural network on the inference hardware to recognize objects in images, wherein executing the trained first neural network on the inference hardware produces results that are bit-identical to results of executing the trained first neural network on the training hardware to recognize the objects in the images.

2. The method as recited in claim 1, wherein at least one object class is used as output data of the first and second neural networks.

3. The method as recited in claim 1, wherein intermediate results from layers of the first and second neural networks are used as output data of the first and second neural networks.

4. The method as recited in claim 1, wherein a deviation between the output data of the training hardware and the output data of the inference hardware is propagated back to noise distributions from layers of the first neural network implemented on the training hardware.

5. The method as recited in claim 1, wherein the first and second neural networks are configured with identical or with different parameters.

6. The method as recited in claim 1, wherein the image data fed to the training hardware and to the inference hardware are changed.

7. The method as recited in claim 1, wherein the inference hardware performs computations using an integer number format and the training hardware performs computations using a floating point number format.

8. The method as recited in claim 1, wherein the iteratively ascertaining the deviation compares intermediate results from layers of the first neural network with intermediate results from layers of the second neural network, and the iteratively ascertaining the noise parameters for the first neural network includes ascertaining noise distributions for outputs of individual layers of the first neural network.

9. A non-transitory machine-readable memory medium on which is stored a computer program for configuring a neural network for operation on inference hardware to detect surroundings, the computer program, when executed by a computer, causing the computer to perform the following steps:
- configuring a first neural network on a training hardware and a second neural network on an interference hardware with identical initial parameters;
- feeding image data to the first neural network implemented on the training hardware and executing the first neural network by the training hardware to generate output data of the training hardware based on the image data, the first neural network including noise parameters;
- feeding the image data to the second neural network implemented on the inference hardware and executing the second neural network by the inference hardware to generate output data of the inference hardware based on the image data, wherein the training hardware uses a different number system than the inference hardware;
- iteratively (i) ascertaining a deviation between output data of the training hardware and output data of the inference hardware and (ii) ascertaining the noise parameters for the first neural network based on the deviation, until feeding the image data to the first neural network implemented on the training hardware and using the ascertained noise parameters and feeding the image data to the second neural network implemented on the inference hardware produces the output data of the inference hardware and the output data of the training hardware that are bit-identical;
- training the first neural network having the ascertained noise parameters on the training hardware; and
- executing the trained first neural network on the inference hardware to recognize objects in images, wherein executing the trained first neural network on the inference hardware produces results that are bit-identical to results of executing the trained first neural network on the training hardware to recognize the objects in the images.

10. The non-transitory machine-readable memory medium as recited in claim 9, wherein the inference hardware performs computations using an integer number format and the training hardware performs computations using a floating point number format.

11. The non-transitory machine-readable memory medium as recited in claim 9, wherein the iteratively ascertaining the deviation compares intermediate results from layers of the first neural network with intermediate results from layers of the second neural network, and the iteratively ascertaining the noise parameters for the first neural network includes ascertaining noise distributions for outputs of individual layers of the first neural network.

\* \* \* \* \*